United States Patent [19]

Marier et al.

[11] Patent Number: 4,592,441

[45] Date of Patent: Jun. 3, 1986

[54] THREE-WHEELED MOTOR VEHICLE WITH PIVOTABLE FRAME

[75] Inventors: Gregory J. Marier, Brooklyn Park; Wayne L. Warnke, Wayzata, both of Minn.

[73] Assignee: Yamaha Hatsudoki Kabushiki Kaisha, Iwata, Japan

[21] Appl. No.: 622,754

[22] Filed: Jun. 20, 1984

[51] Int. Cl.$^4$ .............................................. B62K 5/06
[52] U.S. Cl. ................................. 180/217; 280/112 A
[58] Field of Search ....................... 180/210, 215, 217; 280/62, 112 A, 282

[56] References Cited

U.S. PATENT DOCUMENTS

| | | | |
|---|---|---|---|
| 2,819,093 | 1/1958 | Geiser | 280/112 A |
| 2,878,032 | 3/1959 | Hawke | 280/282 |
| 3,504,934 | 4/1970 | Wallis | 180/217 |
| 3,583,727 | 6/1971 | Wallis | 180/215 |
| 3,781,031 | 12/1973 | Patin | 280/62 |
| 4,159,752 | 7/1979 | Kanno | 280/282 |
| 4,437,535 | 3/1984 | Winchell et al. | 280/112 A |

Primary Examiner—Joseph F. Peters, Jr.
Assistant Examiner—Ross Weaver
Attorney, Agent, or Firm—Orrin M. Haugen; Thomas J. Nikolai

[57] ABSTRACT

A three-wheeled motor vehicle having a two-part frame construction in which a front frame member includes the front steerable wheel assembly and the supports for the driver's seat, and the rear frame assembly includes support for the engine and a driven pair of rear wheels. The front and rear frames are pivotally joined to allow rotational motion of the front frame assembly relative to the rear frame assembly about a generally longitudinal axis, and an arcuate guide bar and associated slide bearings are used to couple the rearmost seat supports of the front frame to the rear frame providing desired rigidity to the composite frame structure.

6 Claims, 6 Drawing Figures

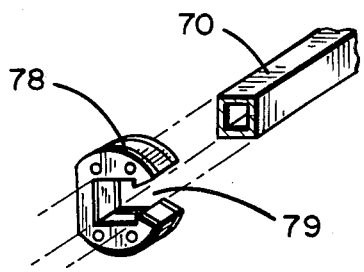
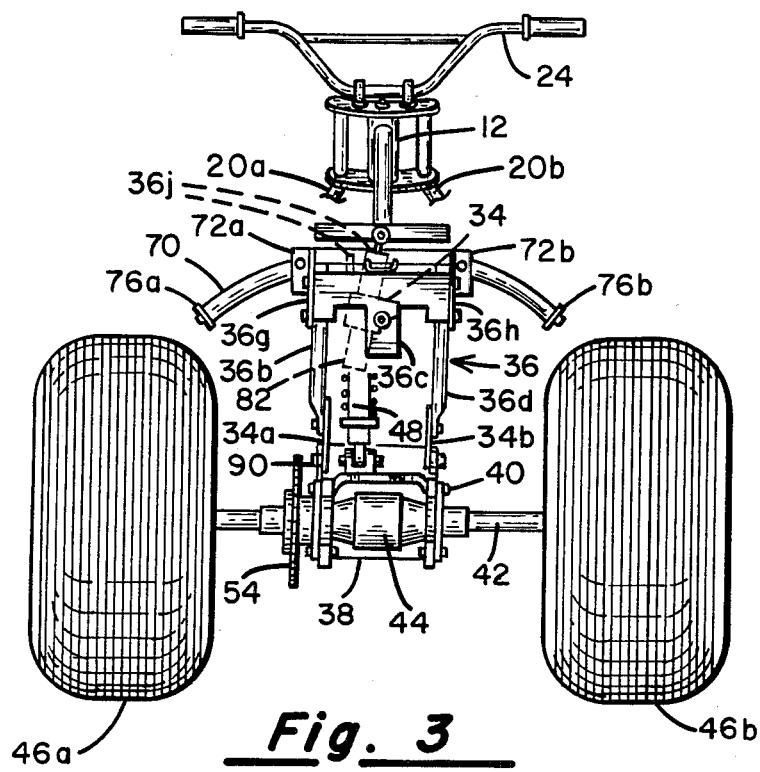
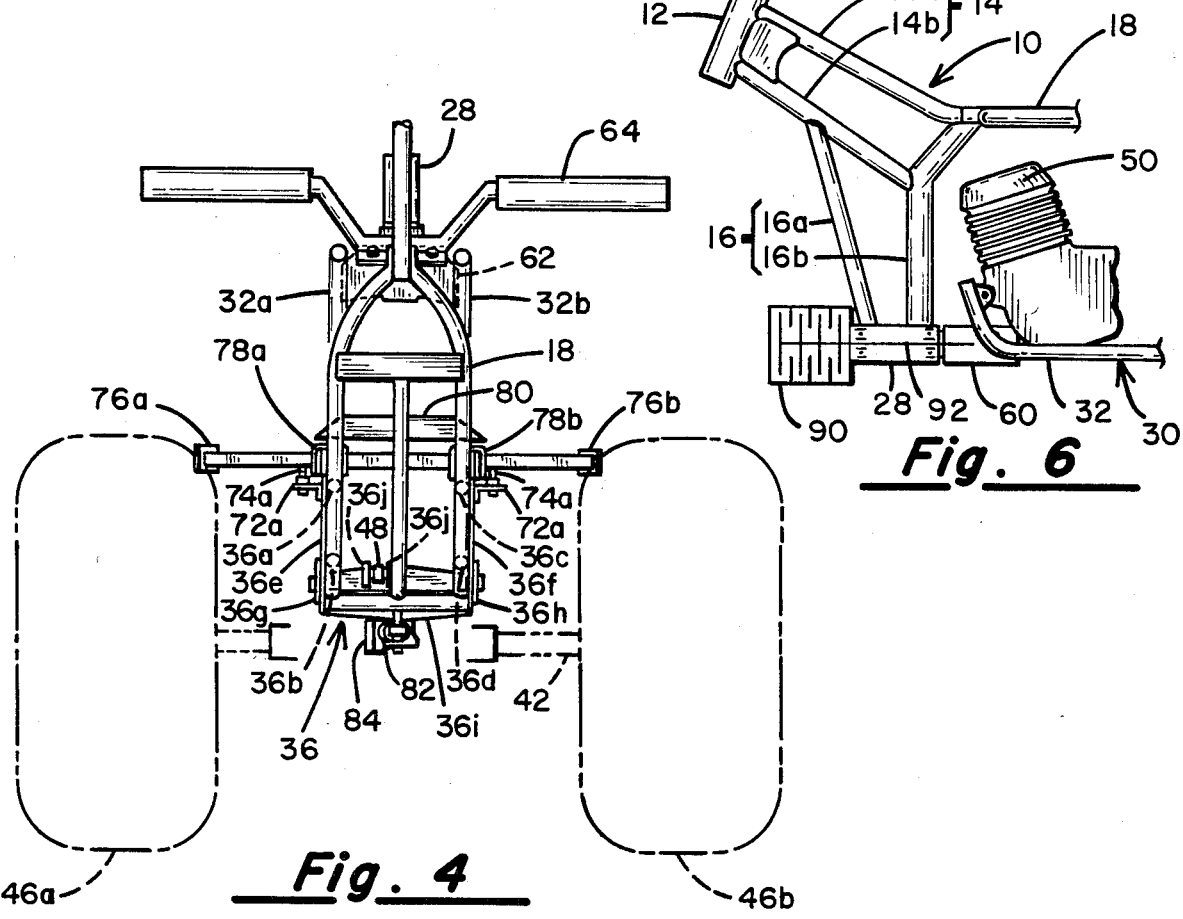

THREE-WHEELED MOTOR VEHICLE WITH PIVOTABLE FRAME

BACKGROUND OF THE INVENTION

I. Field of the Invention

The present invention relates generally to a three-wheeled motor vehicle for off-the-road use in which the three wheels have relatively wide, large-diameter, low-pressure tires, and more particularly to a vehicle of the type described having a front frame holding one steerable wheel and a driver's seat. The front frame is connected to a rear frame which supports the motor, the differential and the rear wheels in such a manner that the front and rear frames are able to be rotated relative to one another about the vehicle's longitudinal axis.

II. Discussion of the Prior Art

Various prior-art three-wheeled motor vehicles for off-the-road use are known. They generally include a front steerable wheel and two rear wheels to which the power output from the engine is applied via a suitable transmission. Each of the wheels is equipped with a relatively wide, large-diameter, low-pressure tire. Such three-wheeled vehicles are commonly used for recreational purposes, such as driving through woods and over rough terrain, but they may also be used for more utilitarian purposes, e.g., for farming, lawn care, snow removing, etc., where appropriate accessories are used therewith. The wide, low-pressure tires provide superior traction and tend not to damage the ground over which the vehicle is made to pass.

As with any three-wheeled vehicle, if an attempt is made to turn a corner at too high a speed, there is a tendency for the inboard rear wheel to lift from the ground which, when a standard differential is employed, may result in the loss of traction. Then, too, an inexperienced operator may negotiate a turn at such high speed that the tipping of the vehicle may render it unstable to the point where injury can occur to the driver if the vehicle should tip over completely.

In accordance with the present invention, the tendency of the vehicle to lose stability while cornering or when traversing uneven terrain is obviated by providing a two-piece frame assembly in which the front wheel and its associated steering mechanism as well as the rider's seat comprise a first part of the frame while the motor support platform, the two rear wheels and the associated differential comprise the second part of the frame assembly. The first and second frame assemblies are joined one to the other by way of a pivot coupling, which permits the front frame to pivot relative to the rear frame about a longitudinal axis of the vehicle. Thus, the rider, while negotiating a turn at a significant speed, may shift his center of gravity by leaning into the turn but without causing the inboard wheel to lift from the ground.

In the Winchell, et al U.S. Pat. No. 4,437,535 there is described a three-wheeled motorcycle which is constructed to have a two-piece frame construction where the front and rear portions thereof are pivotable relative to one another about a longitudinal axis. In this arrangement, the front frame, including the front steerable wheel and the operator's seat, also includes an arch-like structure which completely straddles the rear frame and the engine mounted thereon and is pivotally coupled to the front and rear ends of the rear frame at opposed ends of the arch. The vehicle described in the Winchell et al U.S. Pat. No. 4,437,535 has been designed for over-the-road use rather than off-road use. Hence, that vehicle would not expect to encounter the severe shock and vibration forces introduced upon striking obstacles, hitting uneven spots on the ground and jumping the vehicle wherein at times all three wheels may be off the ground. The present invention has been designed with that more severe use in mind.

In accordance with the invention, a three-wheeled motor vehicle is constructed to have a rocking frame comprised of a front frame member including a steering front wheel and a riding seat which is free to rock laterally with respect to the direction of travel and with respect to a rear frame member which supports the engine and the rear wheels driven thereby. Considering the rough terrain and riding conditions, it is imperative that the overall frame be solidly constructed, especially in the way that the front frame member and the rear frame member are joined together for relative movement therebetween.

OBJECTS

It is the principal object of the present invention to provide an improved three-wheeled vehicle for off-the-road use.

Another object of the invention is to provide a three-wheeled motor vehicle whose frame is constructed in two parts which permit back-and-forth rotational motion of a front frame section relative to a rear frame section.

Yet another object of the invention is to provide a three-wheeled motor vehicle having a front frame member supporting a front steerable wheel and a driver's seat and a rear frame member to which the engine and the wheels driven thereby are joined, the connection between the two allowing lateral rocking motion therebetween.

SUMMARY OF THE INVENTION

In order to achieve the above-specified objects, in accordance with the present invention, the seat support portion of the front frame assembly and the rear frame are suitably joined to each other so as to permit sliding motion whereby the rider may, by shifting his weight, cause the front frame and seat to shift laterally to the right or left relative to the rear frame assembly. The load applied to the seat support during use of the vehicle is born by the rear frame while the load applied to the rear frame due to bumps and other irregularities in the terrain are born by the seat support. Specifically, the three-wheeled vehicle of the present invention has a segmented frame to allow pivoting thereof and comprises a front frame assembly including a steering column supporting a single front steerable wheel, a set of frame struts extending downward from the neck supporting the steering column and a seat support extending toward the rear of the vehicle. The rear frame assembly includes welded tubular members for supporting an engine and two rear wheels which are driven by the engine. The rear frame is rotationally coupled to the downwardly extending struts of the front frame in a manner permitting the front frame assembly to be rocked to the right or left. An arcuate guiderail is affixed to the rear frame and extends transversely to the longitudinal axis of the vehicle, and secured to the seat supports are slide bearings which cooperate with the arcuate guiderail.

DESCRIPTION OF THE DRAWINGS

The present invention will be described in detail in connection with the embodiments thereof depicted in the accompanying drawings.

FIG. 3 is a rear elevation of the preferred embodiment;

FIG. 4 is a fragmentary top plan view of the embodiment of FIG. 1; and

FIG. 5 is a fragmentary view of the arcuate guiderail and associated slide bearing;

FIG. 6 is a fragmentary view of an alternate damper configuration with a friction damper.

DESCRIPTION OF THE PREFERRED EMBODIMENT

Figure 1:
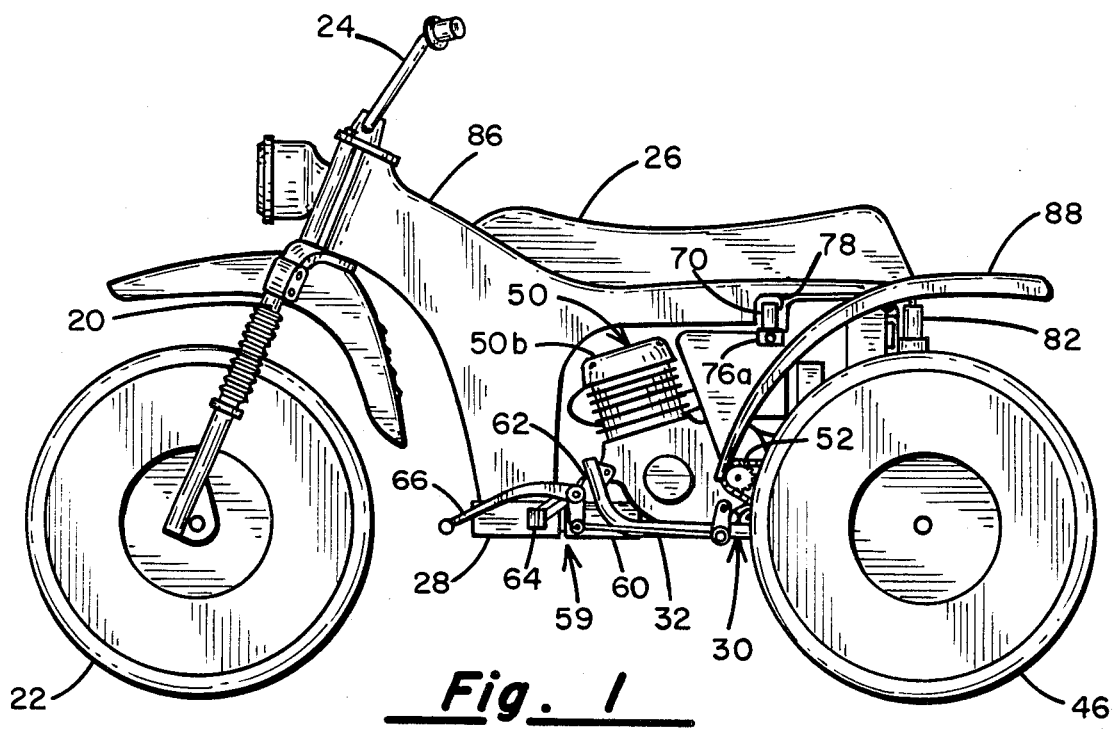
FIG. 1 is a side elevation of a preferred embodiment of the present invention.

Certain terminology will be used in the following description for convenience in reference only and should not be considered as limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. This terminology will include the words above-specifically mentioned, derivatives thereof as well as words of similar import.

Referring to the figures in which like numerals refer to corresponding parts, reference numeral 10 identifies a front frame assembly which is provided with a steering column 12, tubular struts 14a and 14b, downwardly extending tubular struts 16a and 16b which are welded to or otherwise suitably attached to the main struts 14, and a seat support 18 which extends rearward from the main struts 14. A fork 20 including bifurcated legs 20a and 20b is coupled to the steering column 12 through bearings (not shown) in a manner to allow the fork to rotate within the neck of the steering column. A steerable front wheel 22 having a wide, low-pressure tire and handlebars 24 are attached to the lower and upper ends of the front fork member 20, respectively.

Indicated at numeral 26 is a longitudinally extending padded riding seat which is mounted on a rear portion of the aforementioned main struts 14a and on the seat support member 18. A bearing sleeve 28 is welded or otherwise affixed to the lowermost ends of the downwardly extending struts 16a and 16b.

Identified generally by numeral 30 is a rear frame assembly. The rear frame assembly has a pair of lower, horizontal struts 32a and 32b (FIG. 4) and bracket plates 34a and 34b (FIG. 3) affixed to the rearmost ends of the lower frame struts 32. The rear frame assembly 30 further includes upwardly extending frame members 36a through 36d which are arranged in pairs on either side of the frame and which extend upwardly from the bracket plates 34a and 34b. A first horizontally extending tubular frame member 36e connects the upper end of the upright frame members 36a and 36b while a second horizontal tubular member 36f connects the upper ends of the upwardly extending frame tubular members 36c and 36d, all as best can be seen from FIGS. 2 and 3. It may also be observed that a pair of bracket plates 36g and 36h are suitably bolted at the points of intersection between the horizontally extending tubular frame members 36e and 36f and their associated upwardly extending frame elements 36b and 36d on either side of the vehicle frame. A cross-bracket 36i is fastened between the two bracket plates 36g and 36h. Extending between the bracket plate 34a on the left side of the vehicle and the bracket plate 34b on the right side is a rear axle support arm assembly 38. More specifically, the support arm 38 is generally U-shaped and has a pivot pin 40 extending therethrough and through the bracket plates 34a and 34b, allowing vertical movement of the rear axle mounting arm about the pin 40. Affixed to the transversely extending base portion of the U-shaped rear axle support arm is a differential mechanism 44, which couples the left and right rear axles 42. The type of differential mechanism employed may be that set forth in a co-pending application of James E. Grinde, Ser. No. 559,714, filed Dec. 9, 1983 and assigned to the assignee of the instant invention.

A pair of motor-driven wheels 46a and 46b are suitably mounted on the rear axle 42 and the wheels include wide, low-pressure tires. As can best be seen in FIGS. 2 and 3, a shock absorber unit 48 has one end thereof operatively coupled to the rear axle support arm and its other end operatively coupled to the cross-bracket 36i which, as mentioned earlier, extends between the plate members 36g and 36h.

Figure 2:
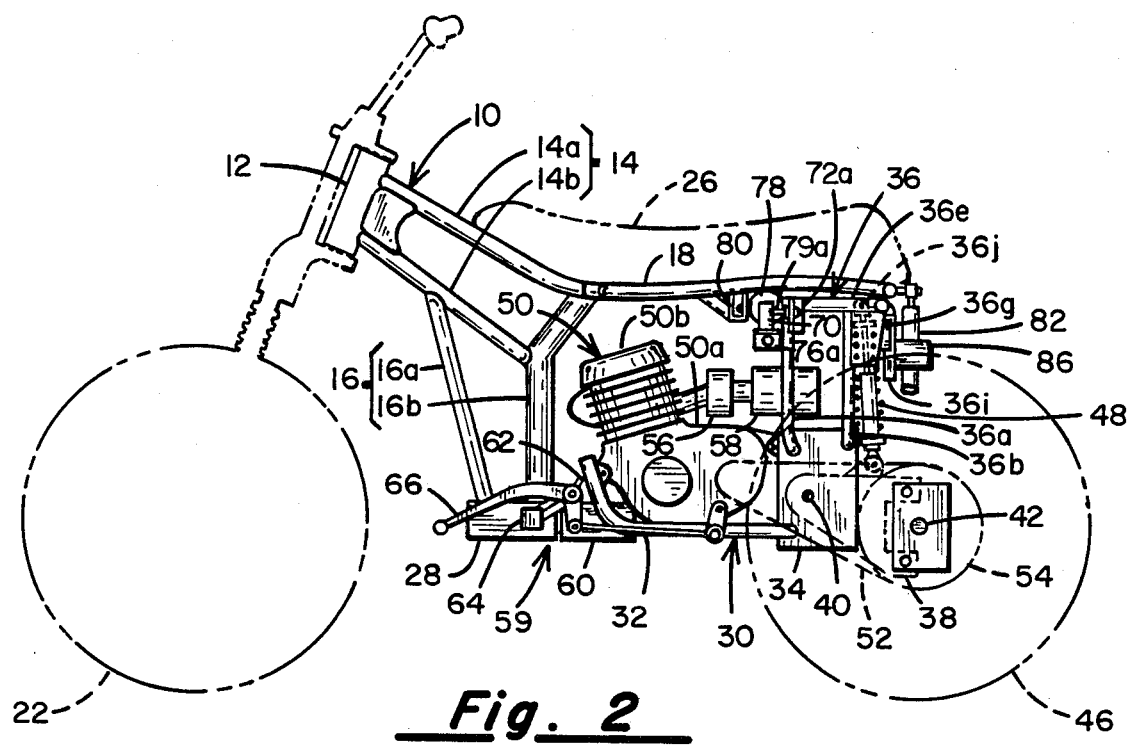
FIG. 2 is a side elevation of the embodiment of FIG. 1 in which the ornamental coverings have been removed to better illustrate the working parts.

As can best be seen in FIGS. 1 and 2, an engine 50, having a crank case 50a containing a transmission, a clutch and related machine elements, is mounted in the space atop the lower horizontal frame struts 32a and 32b and forward of the vertical frame members 36a and 36c. The engine 50 has its cylinder 50b projecting upwards to face the underside of the seat support 18. The output shaft of the engine 50 is coupled through a chain 52 to a sprocket 54 associated with the differential 44.

In FIG. 2, the numerals 56 and 58 refer to the engine's carburetor and air cleaner, respectively, and are mentioned here for the purpose of providing a frame of reference.

Identified generally by numeral 59 is the connector mechanism used to join the front and rear frame assemblies. Specifically, it includes a coupling sleeve 60 which is joined between the front ends of the lowermost tubular frame elements 32a and 32b portion of the rear frame assembly 30 by means of a fastening bracket 62. A connecting shaft (not shown) extends longitudinally through the connecting sleeve 60 of the rear frame assembly 30 and the bearing sleeve 28 of the front frame assembly 10. By providing this shaft coupling, the front frame assembly 10 is allowed to rock laterally to the right and left when the operator shifts his weight or uses his leg muscles to push on one or the other footrests 64.

The right and left footrests 64 are shown in FIGS. 1, 2 and 4 and can be seen to project outwardly from a bracket 62 disposed between the lower frame members 32a and 32b. A shift pedal 56 (FIG. 1) is attached proximate the footrest 64 and a brake pedal (not shown) is located proximate the side of the rear frame 30 where it can be actuated by the driver's foot.

Next, with particular attention being paid to FIG. 4, there is shown an arcuate guiderail 70, which is designed to have a somewhat square cross-section. The guiderail 70 is attached by means of bolts 74a and 74b to brackets 72a and 72b which, in turn, are attached to the upper ends of the vertical frame members 36 of the rear frame assembly 30. As can be seen, the guiderail 70 is held in a transverse orientation relative to the longitudinal axis of the vehicle and beyond the path defined by the periphery of the rear wheels 46. The guiderail 70 has a radius of curvature which is measured from the axis of rotation of the front frame assembly 10 about the connecting shaft, which is telescopingly received within the bearing sleeve 28 of the front frame assembly 10. Stopper plates 76a and 76b (FIG. 3) are attached to both ends of the guiderail 70 to preclude rotation to an extent that the guiderail 70 can slip free from its slide bearings 78a and 78b.

With reference to FIG. 5, slide bearings 78 are shown in a perspective view. Each slide bearing 78 is preferably constructed by laminating a C-shaped piece of a suitable, long-wearing plastic, such as nylon with a low friction plastic, such as Teflon, between correspondingly shaped metal plates. The slide bearings 78 have a rectangular opening therethrough for mating with the corresponding cross-sectional shape of the guiderail 70. The gap 79 formed in the slide bearings permits the bolts 74 to pass therethrough when the slide bearings are made to move relative to the guidebar, all as will be further explained. The slide bearings 78a and 78b are, in turn, affixed to a cross-bracket 80 which, in turn, is secured to the underside of the seat support 18.

The dimensions of the guiderail 70 and the slide bearings 78 establish a predetermined frictional resistance to prevent the free rocking of the front frame assembly 10 relative to the rear frame assembly 30. Thus, when the front frame 10 is shifted to the right or left, not only is a resistive force developed between the guiderail and the bearings 78, but also a resisting force is also created by a dashpot 62, all as will be described in greater detail below.

The rear frame 30 has good stability due to the fact that the two slide bearings 78 are separatively mounted at a predetermined spacing on the seat support 18. If only a single slide bearing had been employed, and had been disposed at the center of the seat support 18, it would be possible to wrench the rear frame to the right and left with respect to an imaginary line joining that slide bearing and the frame coupling member 59 due to shocks introduced by traversing rough road surfaces. By using two slide bearings, however, the rear frame assembly 30 is supported at three points, precluding the type of twisting alluded to. Furthermore, by using the two spaced-apart slide bearings on the guiderail 74, the seat support 18 becomes much more stable and cannot easily be twisted to the right or left, even if the rider should shift his weight off of the center of the seat 26. As such, the seat support 18 and the front frame 10 can be fabricatd from considerably lighter materials.

The reference numeral 82 in FIG. 2 identifies a cylindrical dashpot which functions to provide a predetermined desired resistance against shifting motion of the front frame and seat relative to the rear frame assembly. The dashpot has a piston rod connected at its upper end to the rear end of the seat support 18 and its cylinder connected proximate its midpoint to the previously mentioned cross-bracket 36i by means of the dashpot mounting bracket 84. This bracket serves to mount the dashpot in a slightly inclined orientation when viewed from the rear as in FIG. 3.

Reference numerals 86 and 88 in FIG. 1, respectively, refer to the decorative body cover and the vehicle's rear fender. It is to be noted that the aforementioned guiderail 70 projects beyond those portions of the rear fender 88 which extend along the side of the body. In using the vehicle designed in accordance with the teachings of the present invention, the rider may shift the front frame 10 to the right or left by leaning his body appropriately. At this time, the front frame 10 is shifted to the right or left about the connecting shift, which is fitted in the bearing sleeve 28 of the front frame assembly 10 and the connecting sleeve 60 of the rear frame assembly. In doing so, the seat is guided by the slide bearings 78a and 78b moving along the guiderail 70. That is to say, the seat support 18 is disposed above the rear frame 30, but is supported at its rearmost end by bearings 78a and 78b cooperating with the guiderail 70 where the guiderail 70 is connected to the rear frame 30. Because of this manner of construction, the downward load applied to the seat support 18 is born by the rear frame 30. On the other hand, the shock loads applied via the rear wheels 46 from the road surface are transmitted through the shock absorber unit 48 to the vertical frame members 36 of the rear frame assembly 30, tending to elevate the rear frame 30. However, those loads are born by the seat support 18. In other words, the seat support 18 and the rear frame 30 are joined to each other through the slide bearings 78 and the guiderail 70. As a result, the rigidity of the seat support 18 is enhanced while the bending moment applied to the tubular connector 60 of the front and rear frames 10 and 30 is reduced. Since, according to the present embodiment, the dashpot 82 is interposed between the front and rear frames 10 and 30, the vibrations of the rear frame due to undulations of the road surface are transmitted to the front frame 10 via the dashpot 82. Hence, even though the footrests 64, the shift pedal 66 and the brake pedal are attached to and project from the sides of the rear frame 30, some of the vibration transmitted to the feet of the rider when transmitted through the dashpot and seat to the upper body of the driver, the vibration is somewhat damped and the riding comfort of the vehicle is correspondingly improved.

Since the guiderail 70 is elevated above the periphery of the rear wheels 46, tipping of the front frame 10 does not interfere with the rear wheels 46. Hence, a large angle of rotation of the front frame 10 can be assured. The present invention offers the further advantage in that should engine maintenance be required, the front frame and seat can be rotated so as to give greater access to the engine 50.

While in the embodiment heretofore disclosed, the dashpot 82 is shown as being disposed at the rear of the seat support 18, it also may be located in another position, e.g., it may be attached to the front of the sleeve 60 connecting the front and rear frame assemblies 10 and 30 together. FIG. 6 is a side elevation view showing a portion of a further embodiment in which a frictional-type motion damper 90 is used in place of the dashpot 82. More specifically, a connecting shaft 92 affixed to the connecting sleeve 60 is extended through the bearing sleeve 28 so that a dampening force is generated by the friction between a first plate or set of plates operatively connected to the projecting end of the shaft 92 and a second plate or set of plates attached to the bearing sleeve 28.

Those skilled in the art will understand that the present invention can be applied not only to a motor vehicle equipped with a rear suspension in which the rear wheels 46a and 46b are jointly suspended, all as previously described, but also to either a motorcycle in which individual rear wheels are suspended to move up and down independently of one another, or to a motor vehicle in which the rear axle bearings are rigidly attached to the rear frame without the use of a rear suspension system of any type. These modifications are considered to be included as a part of the present invention. The invention also extends to a motor vehicle which may be equipped with a different mechanism between the two rear wheels.

Summarizing the advantages of the present invention, through the use of the arcuate guiderail 70 attached in a transverse position on the rear frame and coupled one of the seat supports of the front frame by the C-shaped slide bearings 78, the downward load applied to the seat support by the rider is born by the rear frame, while the upward load applied to the rear frame due to bouncing on rough terrain is born by the seat support as well. As a result, and without limiting the rocking motions of the front frame assembly relative to the rear, the rigidity of the seat support is enhanced while bending moments applied to the pivot coupling of the front and rear frames is reduced. This provides a motor vehicle which has greater frame strength but without a significant increase in the weight of the frame parts themselves.

While one could achieve a pivoting connection between the front and rear frame assembly by using pivot bearings for connecting the forward and rearward ends of the rear frame 30 to the front frame 10 as in the Winchell et al patent, in such an arrangement the front frame necessarily must ride over the rear frame requiring a much longer and heavier front frame construction and sacrificing some rigidity. The approach of the present invention is, therefore, deemed to be significantly superior to this alternative way of implementing a pivoting frame. Because the front frame 10 need not be extended to the back of the rear frame assembly 30 (which would be required if the two frames are to be joined by pivot bearings), there is less opportunity for interference between the front and rear frames when the front frame is shifted to the left or right.

The invention has been described herein in considerable detail, in order to comply with the Patent Statutes and to provide those skilled in the art with information needed to apply the novel principles and to construct and use such specialized components as are required. However, it is to be understood that the invention can be carried out by specifically different equipment and devices, and that various modifications, both as to equipment details and operating procedures, can be effected without departing from the scope of the invention itself.

What is claimed is:

1. A three-wheeled motor vehicle comprising, in combination:
   (a) a front frame assembly including
      (i) a steering column supporting one steerable front wheel,
      (ii) a plurality of downwardly extending struts affixed to said steering column, and
      (iii) a seat support member extending rearward from said steering column;
   (b) a rear frame assembly rotationally coupled to said downwardly extending struts, said rear frame assembly including
      (i) an engine mounted thereon,
      (ii) a pair of wheels journaled for rotation on axle means mounted on said rear frame assembly and driven by said engine, and
      (iii) an arcuate guiderail attached transversely to one of said seat support member and said rear frame assembly at a location above said pair of wheels and forward of said axle means;
   (c) first and second slide bearing means attached to the other of said seat support and said rear frame assembly and at spaced-apart locations and fitted about said arcuate guiderail for lateral sliding movement therealong with a predetermined desired frictional resistance therebetween; and
   (d) a dashpot coupled between said front frame assembly and said rear frame assembly inhibiting the free rotation of said rear frame assembly relative to said front assembly.

2. A three-wheeled motor vehicle as in claim 1 wherein said arcuate guiderail is attached to said rear frame assembly.

3. A three-wheeled motor vehicle as in claim 2 wherein said rear frame assembly further includes a plurality of struts extending upwardly at a location between said engine and said axle means, said guiderail being attached to said upright strut.

4. A three-wheeled motor vehicle as set forth in claim 1 and further including footrest means affixed to said rear frame and projecting laterally outwardly from opposed sides of said rear frame assembly.

5. A three-wheeled motor vehicle as set forth in claim 4 and further including brake pedal means and shift pedal means attached to said rear frame assembly.

6. The three-wheeled vehicle as in claim 1 wherein said front frame assembly further includes:
   (a) a cylindrical sleeve affixed to the lower ends of said plurality of downwardly extending struts, the longitudinal axis of said sleeve being generally aligned with the longitudinal axis of said motor vehicle;
   (b) bearing means in said sleeve;
   (c) said rear frame assembly including forwardly projecting shaft means journaled in said bearing means; and
   (d) said dashpot being operatively coupled between said sleeve and said forwardly projecting shaft means.

* * * * *